United States Patent [19]

Okada

[11] 4,090,057
[45] May 16, 1978

[54] METHOD FOR CONTROLLING THE SHAPE OF A MOLTEN POOL IN GAS SHIELD ARC WELDING

[75] Inventor: Akira Okada, Tokyo, Japan

[73] Assignee: National Research Institute for Metals, Tokyo, Japan

[21] Appl. No.: 724,229

[22] Filed: Sep. 17, 1976

[30] Foreign Application Priority Data

Sep. 18, 1975   Japan .................................. 50-112060

[51] Int. Cl.² ............................................... B23K 9/00
[52] U.S. Cl. ....................................... 219/122; 219/70; 219/75
[58] Field of Search ................... 219/74, 123, 75, 122, 219/70

[56] References Cited

U.S. PATENT DOCUMENTS

| | | | |
|---|---|---|---|
| 1,638,336 | 8/1927 | Himes | 219/122 X |
| 2,702,846 | 2/1955 | Breymeier | 219/123 X |
| 3,495,066 | 2/1970 | Broyard | 219/74 |
| 3,715,561 | 2/1973 | Hammarlind | 219/75 |
| 3,838,243 | 9/1974 | Inagaki | 219/75 |

Primary Examiner—E. A. Goldberg
Attorney, Agent, or Firm—Sherman & Shalloway

[57] ABSTRACT

A method is disclosed in which gas shield arc welding is carried out while applying a gas at a higher pressure than the shield gas to the rear part of the surface of molten metal during welding. By this method, welding proceeds while the molten pool is being maintained in the desirable shape, and the welding can be performed at high currents and speeds without causing bead defects such as undercut formation or humping.

9 Claims, 19 Drawing Figures

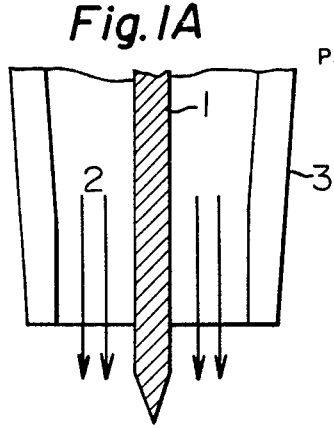
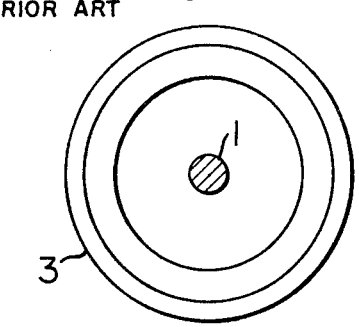
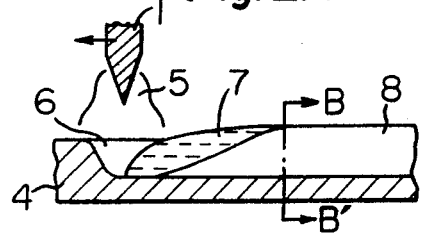
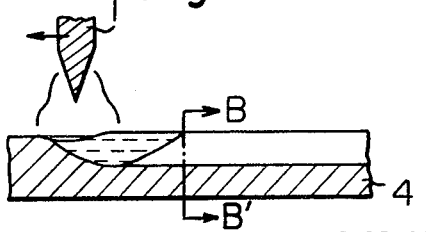
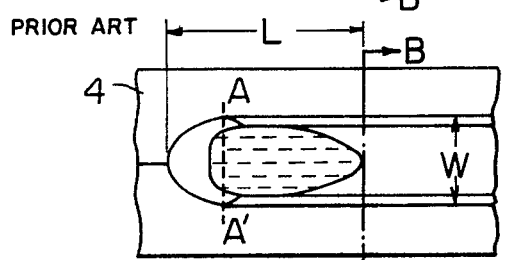
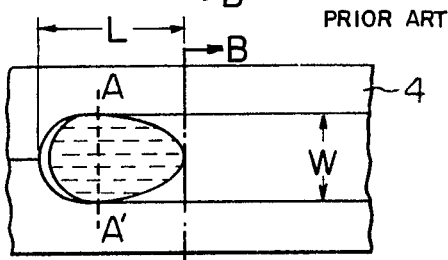
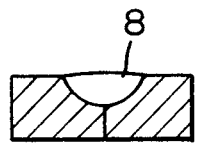

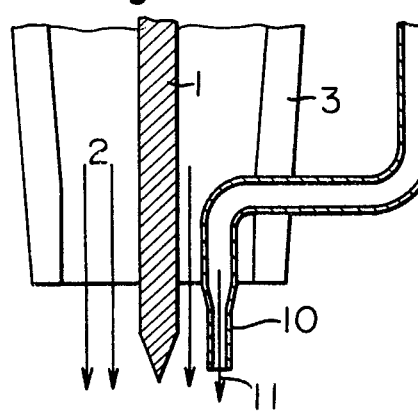
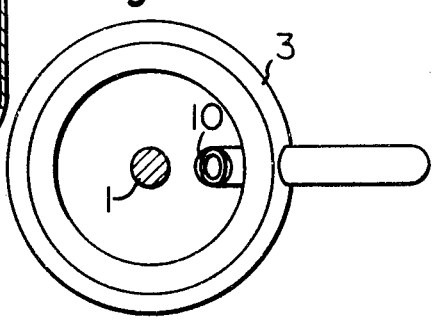
Fig. 4A  Fig. 4B
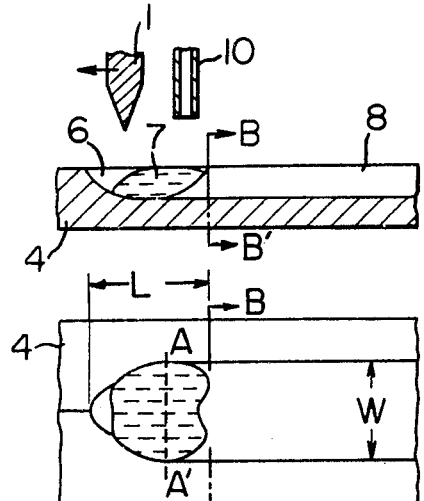
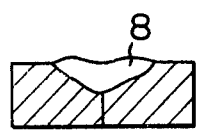
Fig. 5A  Fig. 5B  Fig. 5C
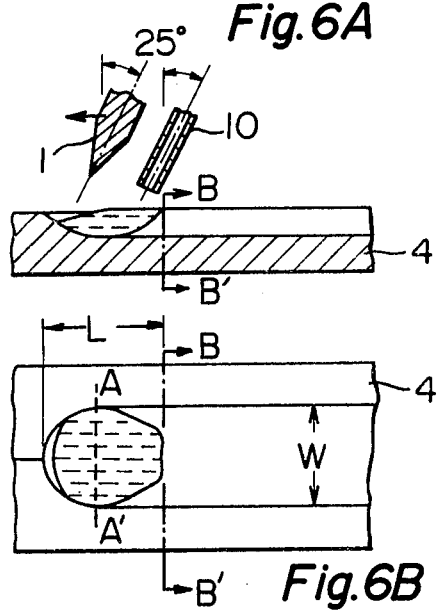
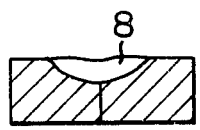
Fig. 6A  Fig. 6B  Fig. 6C

METHOD FOR CONTROLLING THE SHAPE OF A MOLTEN POOL IN GAS SHIELD ARC WELDING

This invention relates to a method for controlling the shape of a molten pool in gas shield arc welding by applying a gas to molten metal during welding.

Arc welding is a process which comprises generating an arc between an electrode and a workpiece, and moving the arc while locally melting the workpiece by the heat of the arc thereby to perform its welding. The gas shield are welding process involves surrounding the electrode with a gas nozzle in the arc welding process, and performing the welding while causing an inert gas such as argon or carbon dioxide gas to flow from the nozzle thereby to surround the arc by the gas.

Since the workpiece is locally melted by the heat of the arc in the arc welding process, gouging occurs in the melted part of the workpiece. The molten metal gathers in this gouging, and is cooled and solidified to complete the welding. In the present application, the molten metal which has gathered in the gouging is referred to as a molten pool.

With the movement of the arc, the molten pool gradually advances, and the molten metal progressively solidifies from the rear part to the front part to form a weld bead. The shape of the bead is greatly affected by the shape of the molten pool. For example, the molten pool becomes larger and the efficiency of welding increases if the welding current is increased. However, increasing of the welding speed causes the molten metal in the molten pool to be pushed rearward of it, and solidify in the raised state. This causes undercut formation or a humping phenomenon whereby periodical raised and depressed portions occur in the bead. In the case of welding in a vertical position, a defective weld bead is formed as a result of the sagging of the molten metal.

In an attempt to avoid the above difficulty, various methods have been proposed to date and some have come into commercial acceptance. They include a method in which welding is carried out while placing the electrode in an inclined position, a method in which welding is carried out while deflecting the arc by a magnetic field, and the method disclosed in U.S. Pat. No. 3,838,243 in which welding is performed while deflecting a welding arc by a jet stream of inert gas. These methods bring out some effect, but since they do not directly affect the molten pool, it is impossible to control the shape of the molten pool sufficiently and thus to obtain the excellent effect achieved by the present invention.

It is an object of this invention to provide a method for gas shield arc welding in which the shape of the molten pool is controlled so as to prevent the occurrence of bead defects by undercut, humping, or sagging of molten metal, and welding can be performed at a higher current than in the conventional methods with higher welding speeds or in a vertical position.

The above object of the invention can be achieved by a method for controlling the shape of a molten pool in a gas shield arc welding which comprises providing a second gas nozzle whose gas flow outlet at the tip is opened toward the molten metal of a workpiece, at a position within a space between an electrode and the inner wall of a shield gas nozzle in a gas shield arc welding torch which position is rearward of the electrode with regard to the welding direction, and performing gas shield arc welding while applying a second gas stream (control gas stream) at a pressure higher than the shield gas to a part of the surface of molten metal through the second gas nozzle, thereby to pressurize and cool the molten metal and deflect the arc in the welding direction.

The invention is more specifically described below by reference to the accompanying drawing in which:

FIG. 1 is a schematic view of the forward end portion of a shield gas nozzle in a conventional gas shield arc welding torch, (1-A) being a side elevation and (1-B) a bottom view;

FIGS. 2 and 3 are schematic views showing the shapes of a molten pool when welding is performed at a high current and a high speed (FIG. 2), or at a low current and a low speed (FIG. 3) using the welding torch shown in FIG. 1, (2-A) and (3-A) being side elevations, (2-B) and (3-B) being top plans, and (2-C) and (3-C) being sectional views taken along the line B-B';

FIG. 4 is a schematic view of one example of the structure of the tip portion of a shield gas nozzle in a welding torch used in the present invention, (4-A) being a side elevation and (4-B) a bottom view;

Figure 7:
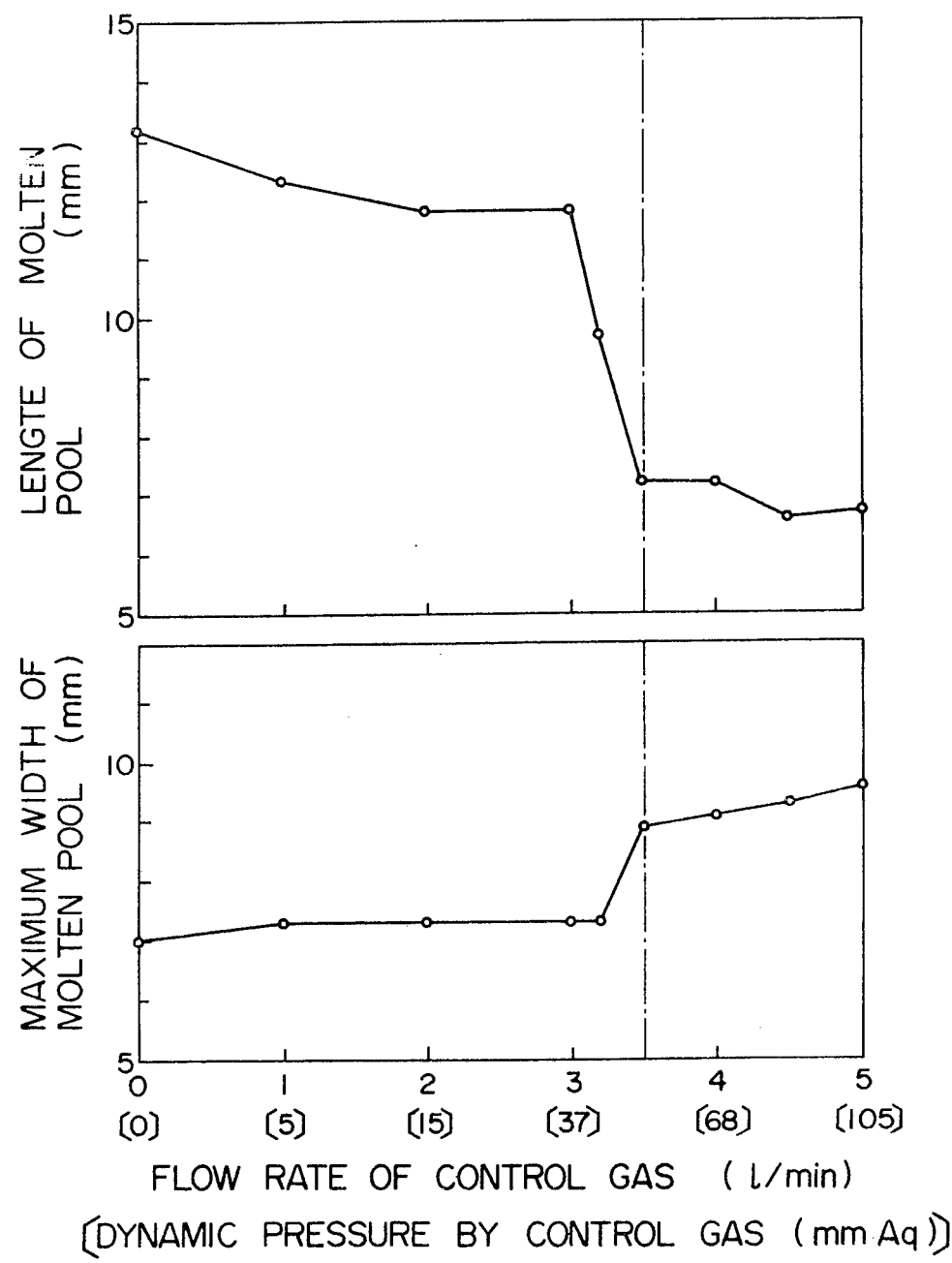
Figure 8:
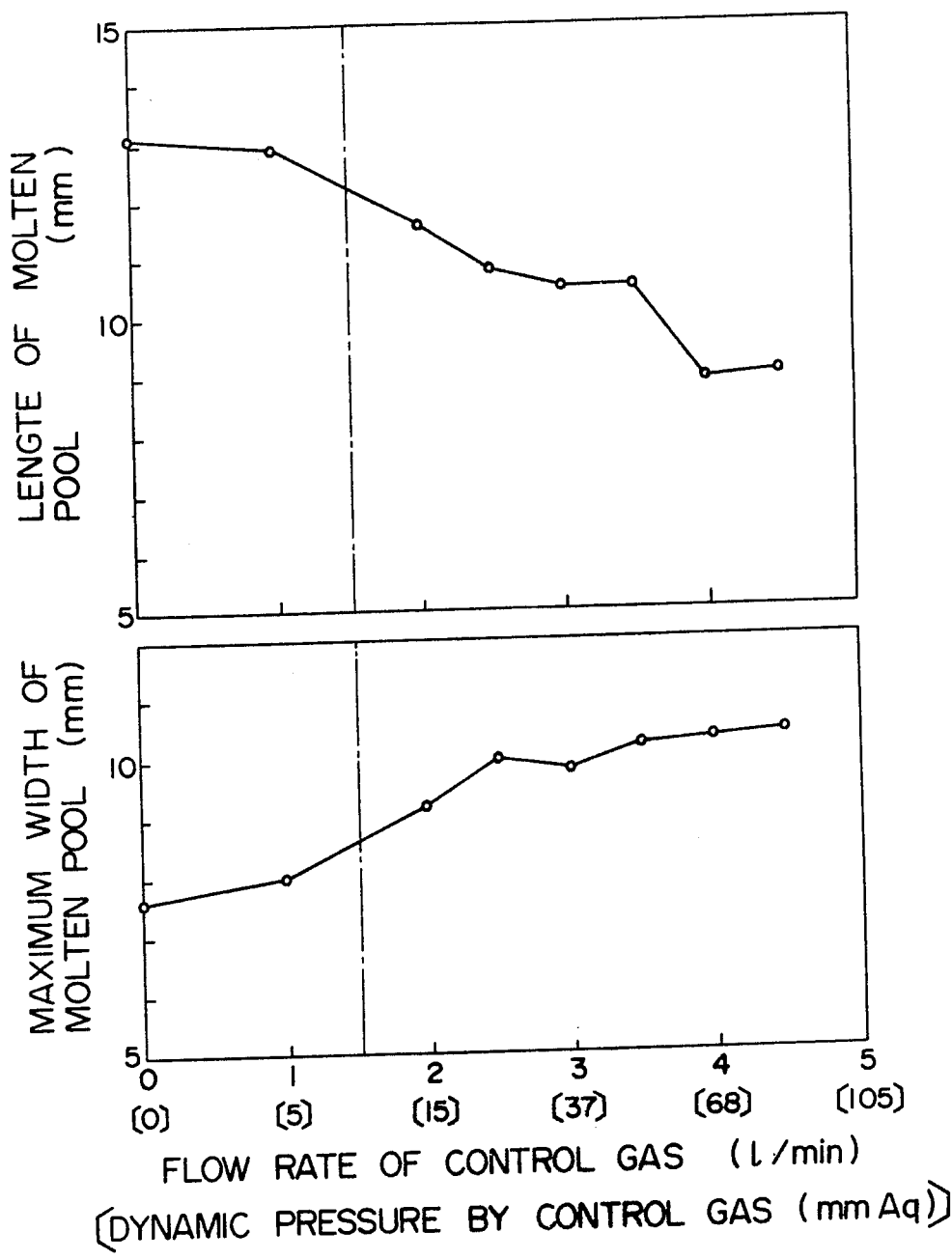
Figure 9:
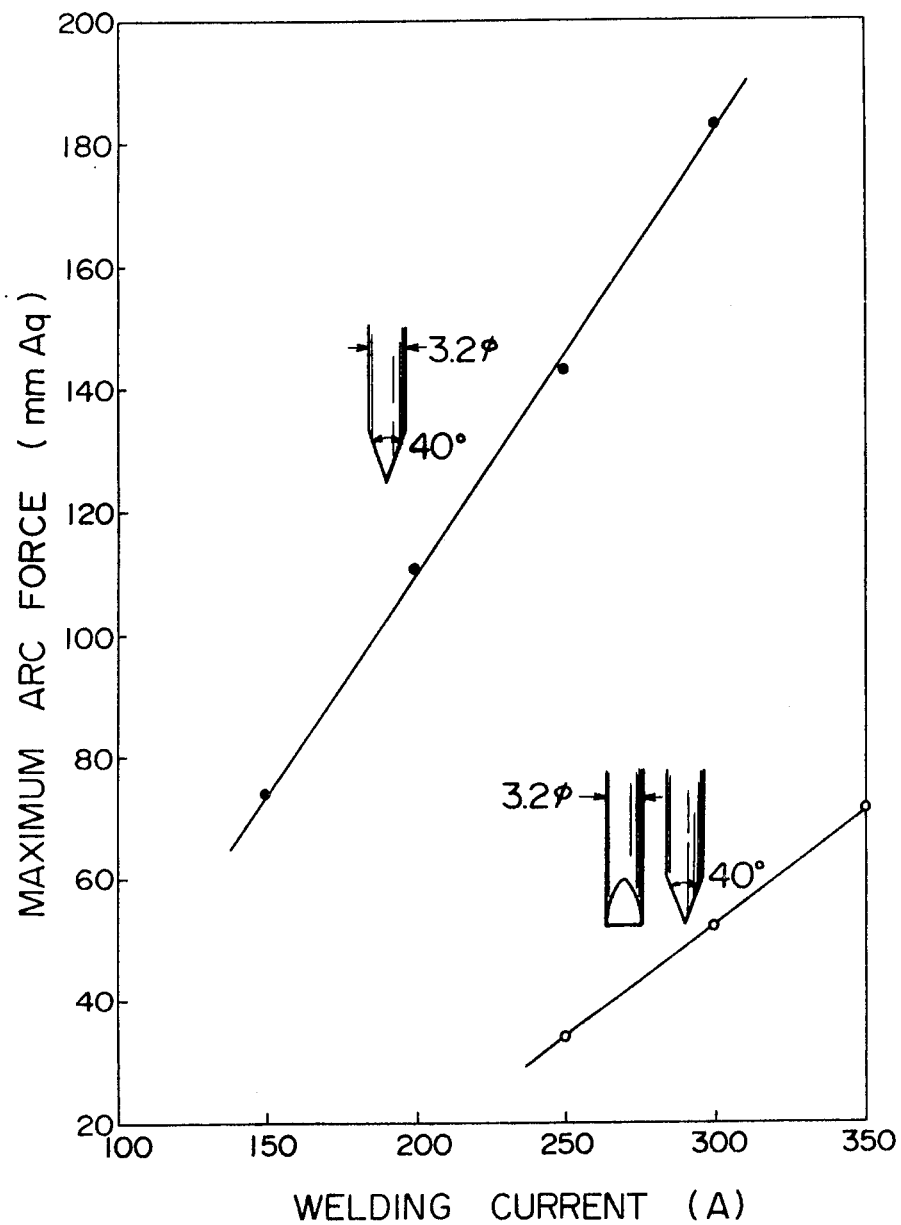

FIGS. 5 and 6 are schematic views showing the shapes of a molten pool when welding is performed while placing the welding torch perpendicular to the workpiece (FIG. 5) or while placing it inclined to the workpiece (FIG. 6) in accordance with the present invention, (5-A) and (6-A) being side elevations, (5-B) and (6-B) being top plans, and (5-C) and (6-C) being sectional views taken on the line B-B';

FIG. 7 is a diagram showing the changes in the dimension of the molten pool versus the flow rate of a control gas when arc welding is performed by the method of this invention using the welding torch shown in FIG. 4;

FIG. 8 is a diagram showing changes in the dimension of the molten pool and the flow rate of a control gas;

FIG. 9 is a diagram showing a comparison of pressures on a water-cooled copper panel immediately below electrodes when arc is generated by disposing the water-cooled copper panel face to face with an electrode having a conical shape at its tip and an electrode having a wedge-like shape at its tip.

The tip portion of the shield gas nozzle of the conventional gas shield arc welding torch as shown in FIG. 1 has a structure such that a shield gas 2 is caused to flow through a shield gas nozzle 3 around a metal electrode 1. FIGS. 2 and 3 show the shapes of molten pools composed of a gouging portion 6 and a molten metal part 7 immediately below arc and the section of a weld bead 8 formed consequently, when an arc 5 is generated between the electrode metal 1 and a metal plate 4 using the conventional gas shield arc welding torch.

FIG. 2 shows the shape of a molten pool which is observed when the welding current is relatively high and the welding speed is fast. Under these welding conditions, the arc force is great, and the length (L) of the molten pool becomes large. Accordingly, the molten metal moves rearward (in a direction opposite to the welding direction), and the space of gouging 6 formed immediately below the arc increases in dimension. When the space of the gouging 6 becomes larger in size, an undercut 9 is formed in which the toe portion of the weld bead 8 is slightly decreased (see B-B' section). The size of the undercut is dependent on the state of contact of the molten metal with the edge of a molten pool at a position where the width shown by dotted line A-A' of the molten pool has reached the maximum W. The size of the undercut increases as the length L of the molten pool becomes greater, the molten metal moves to a greater extent in the rearward direction, and the space of the gouging 6 immediately below the arc becomes larger. When the space of the gouging 6 becomes even larger, a humping bead is formed in which the bead has raised and depressed parts. All these become weld defects.

FIG. 3 shows the case where the welding current is relatively low, and the welding speed is low. In this case, the arc force is low, and the length of the molten pool becomes relatively short. Consequently, the rearward movement of the molten metal is reduced, and only a small space is present in the front edge of the molten pool. Thus, no undercut is formed, but a flat weld bead results.

On the other hand, when welding is carried out in a vertical up-position, the molten metal tends to move to the rear of the molten pool by the influence of gravity, and the molten pool tends to assume the condition shown in FIG. 2. Consequently, the weld bead becomes excessively raised, and the molten metal may fall off from the molten pool.

As mentioned above, in welding at high currents either at high speeds or in a vertical position, the molten pool assumes the condition shown in FIG. 2 owing to the large length of the molten pool and the high arc force, thus causing defects to the weld bead.

According to the present invention, the shape of the molten pool shown in FIG. 2 is adjusted to a shape corresponding to FIGS. 5 or 6 in which the length of the molten pool is shortened.

FIG. 4 shows one preferred example of the structure of the tip portion of a shield gas nozzle of a gas shield welding torch used in the present invention. In FIG. 4, a control gas nozzle 10 consisting of a slender conduit is mounted inside a shield gas nozzle 3 and rearward of a metal electrode (in a direction opposite to the welding direction) in a manner such that it extends through the shield gas nozzle 3 from its outside. The tip of the control gas nozzle 10 is disposed within a flow path of a shield gas 2, and faced such that when welding is carried out under given welding conditions without using a control gas, a control gas jet stream 11 from it collides with the surface of molten metal rearward of the dotted line A-A' which shows the maximum melting width of the molten pool. It has been found that if a control gas at a pressure higher than the shield gas is jetted out from the control gas nozzle during welding, the control gas can adjust the shape of the molten pool to the one shown in FIGS. 5 or 6 which has a shortened length of molten pool, by the action to be described below.

Firstly, the control gas cools the surface of molten metal rearward of the position A-A' at which the width of the molten pool becomes maximum to quicken its solidification, with the result that the length of the molten pool is shortened. Secondly, the control gas imparts pressure to the surface of molten metal rearward of the position A-A' thereby to reduce the space of the gouging formed by the arc force, and to elevate the position of the surface of molten metal in contact with the position A-A' to the surface of the workpiece. Thirdly, a part of the control gas jet stream which has collided with the surface of molten metal flows forwardly to push the anode or cathode point of arc generation in the forward direction and deflect the arc forwardly. As a consequence, the arc force exerted on the molten pool is reduced, and the depth of the gouging is lessened. Furthermore, this causes a reduction in the component of the arc force which pushes the molten metal in the rear direction.

When the flow rate of a gas to be jetted out from the control gas nozzle is periodically stopped, the molten metal in the molten pool oscillates periodically. This renders the wettability of the molten metal better, and enhances the effects of the invention, particularly the effect of preventing undercut formation. The period of changing the flow rate of the gas is about 1 to 500 Hz, but periods of about 10 to 50 Hz are most effective.

In the method of this invention, shield gas used in the conventional gas shield arc welding processes, for example, inert gases such as argon and helium and carbon dioxide gas, are used. These shield gases can also be used as the control gas, but it is not necessary to use the same kinds of gases both as the control gas and the shield gas.

In the present invention, a device obtained by securing a control gas nozzle to a gas shield arc welding torch of the conventional type having a shield gas nozzle with an inside diameter of about 10 to 25 mm can be conveniently used. Since a shield gas is flowed at a flow rate within the range used in ordinary gas shield arc welding, for example, 10 to 25 liters/min., the flow rate per unit cross sectional area of the flow path of the nozzle is extremely small, and the dynamic pressure induced by the shield gas is so small that it can be neglected.

The inside diameter of the control gas nozzle is preferably 1 to 4 mm. From this nozzle, a control gas is flowed at such a flow rate that a dynamic pressure of about 100 mmAq to 300 mmAq, preferably 40 mmAq to 100 mmAq, is exerted on the rear part of molten metal. For example, when a control gas is flowed at a flow rate of 3 to 5 liters/min. from a control gas nozzle having an inside diameter of 2 mm, the resulting dynamic pressure is about 40 to 100 mmAq. The rear portion of the molten pool is pressurized by this dynamic pressure.

In the method of this invention, welding currents of DC 100 A to 500 A, and welding speeds of 10 to 200 cm/min. or more are used. The advantages of the present invention can be obtained particularly under high-current high-speed conditions in which the current is at least 200 A and the speed is at least 60 cm/min.

In the present invention, both nonconsumable and consumable electrodes can be used. A typical example of the nonconsumable electrodes is a thorium-containing tungsten electrode whose tip is shaped in a conical configuration. It has now been found also that a nonconsumable electrode whose tip is shaped like a wedge is exceedingly advantageous to reduce the arc force, that is, the force to render the molten pool in the undesired shape, and to maintain the molten pool in the desired shape in accordance with this invention.

FIGS. 5 and 6 show the shapes of the molten pools when welding is carried out while jetting out a control gas at a suitable flow rate for the welding conditions employed, using the welding torch of the present invention as shown in FIG. 4. FIG. 5 shows the result obtained when electrode 1 and control gas nozzle 9 are placed at right angles to metal plate 4, and FIG. 6 shows the results obtained when they are inclined to the metal plate 4 at an angle of 25°. As can be seen from these drawings, that part of the molten pool which is rearward of the position A-A' at which the width of the molten pool becomes maximum is shortened by the above-mentioned actions, and as a result, only a small gouging is formed at the front edge of the molten pool, and it is possible to obtain a weld bead free from defects such as undercuts.

The following Examples further illustrate the method of the invention and the effects obtained by it.

EXAMPLE 1

This Example and Example 2 show how the shape of the molten pool, particularly, its length L and maximum width W, actually changes when gas shield welding is carried out while applying a control gas jet stream to the surface of molten metal.

Steel plates having a thickness of 4 mm were welded while flowing a control gas at a flow rate of 0 to 5 liters/min. using a gas shield arc welding torch of the type shown in FIG. 4. The distance between the electrode and the workpiece was adjusted to 3 mm; the welding current, to 300 A; and the welding speed, to 5 cm/min. The electrode was maintained perpendicular to the surface of the workpiece.

The electrode used was a thorium-containing tungsten electrode with a diameter of 3.2 mm whose tip was sharpened in a conical shape with an angle of 40°. The shield gas nozzle was made of a copper material and having an inside diameter of 16 mm. The control gas nozzle was a copper tube with an outside diameter of 3 mm and an inside diameter of 2 mm. The tip portion of the control gas nozzle was shaped in an elliptical shape with a long diameter of 3.5 mm and a short diameter of 2.2 mm. The distance between the electrode and the control gas nozzle was adjusted to 5 mm. Argon gas was used both as the control gas and the shield gas. The shield gas was fed at a flow rate of 25 liters/min.

The length and maximum width of the molten pool with regard to the flow rate of the control gas and the dynamic pressure induced thereby were measured, and the results are shown in Table 1 and FIG. 7.

Table 1

| Flow rate of control gas (liters/min.) | Dynamic pressure by the control gas (mmAq) | Maximum width of the molten pool (mm) | Length of the molten pool (mm) |
| --- | --- | --- | --- |
| 0 | 0 | 7.0 | 13.2 |
| 1 | 5 | 7.2 | 12.3 |
| 2 | 15 | 7.2 | 11.8 |
| 3 | 37 | 7.3 | 11.8 |
| 3.25 | 43 | 7.3 | 9.7 |
| 3.5 | 51 | 8.9 | 7.2 |
| 4 | 68 | 9.1 | 7.2 |
| 4.5 | 86 | 9.3 | 6.6 |
| 5 | 105 | 9.6 | 6.7 |

In FIG. 7, the axis of abscissas represents the flow rate of the control gas, and the axis of ordinates, the length L and the maximum width W of the molten pool.

The results shown in Table 1 and FIG. 7 demonstrate than when the flow rate of the control gas is increased, the length of the molten pool becomes gradually shorter and abruptly changes for a short while at a certain flow rate of the control gas (critical value shown by the chain line in FIG. 7), followed by small extents of changes. The width of the molten pool does not so much change until the flow rate of the control gas reaches the critical point. It abruptly increases past the critical value, and thereafter does not change so much. The shape of the molten pool changes from FIG. 2 to FIG. 5 after the flow rate of the control gas has increased beyond the critical point at which the dimension of the molten pool abruptly changes.

EXAMPLE 2

Welding was performed in the same way as in Example 1 except that the welding torch and the electrode were inclined at an angle of 25° to the workpiece. The results obtained are shown in Table 2 and FIG. 8.

Table 2

| Flow rate of control gas (liters/min.) | Dynamic pressure by the control gas (mmAq) | Maximum width of the molten pool (mm) | Length of the molten pool (mm) |
| --- | --- | --- | --- |
| 0 | 0 | 7.6 | 13.1 |
| 1 | 5 | 8.0 | 12.9 |
| 2 | 15 | 9.2 | 11.6 |
| 2.5 | 26 | 10.0 | 10.8 |
| 3 | 37 | 9.8 | 10.5 |
| 3.5 | 51 | 10.2 | 10.5 |
| 4 | 68 | 10.3 | 8.9 |
| 4.5 | 86 | 10.4 | 9.0 |

In this Example, too, the length of the molten pool decreases with increasing flow rate of the control gas stream, and the shape of the molten pool changes from FIG. 2 to FIG. 6.

Thus, when the flow rate of the control gas stream is increased, the length of the molten pool decreases gradually. When it reaches the critical value, the molten pool assumes the shape shown in FIGS. 5 or 6 which can be obtained only by the method of the present invention, as a result of a drastic reduction in the length of the molten pool. The method of the present invention therefore makes it possible to control the shape of the molten pool by adjusting the flow rate of the control gas jet stream.

EXAMPLE 3

This Example shows that welding can be performed at much higher currents and speeds than in the conventional methods owing to the effect of controlling the shape of the molten pool by the method of the present invention.

A welding test was performed in the same way as in Example 1 except that the welding currents, the electrode inclination angles and the shape of the tip of electrode as shown in Table 3 were used, and the welding speed was varied. This test was performed to examine to how much welding speed a conventional method not using a control gas and the method of the invention can perform proper welding without causing undercuts while maintaining the welding current constant. The results are shown in Table 3.

Table 3

| | Shape of the tip of the electrode | Angle of inclination of electrode | Welding current | | |
| --- | --- | --- | --- | --- | --- |
| | | | 250 A | 300 A | 350 A |
| Conventional method | Conical 40° | 0° | 40 cm/min. | 30 cm/min. | — cm/min. |
| Method of the invention | Conical 40° | 0° | 85 | 75 | 65 |
| | Conical 40° | 25° | 110 | 100 | 90 |
| | Wedge-shaped 40° | 0° | 140 | 130 | 120 |
| | Wedge-shaped | 25° | above | above | above |

Table 3-continued

| Shape of the tip of the electrode | Angle of inclination of electrode | Welding current | | |
|---|---|---|---|---|
| | | 250 A | 300 A | 350 A |
| 40° | | 150 | 150 | 150 |

It can be seen from the results shown in Table 3 that when an electrode whose tip was processed into a conical shape with an angle of 40° was used, the method of the present invention can increase the welding speed to about 2 times that in the conventional method at the same current.

When welding is performed by inclining the electrode in the method of this invention, welding can be performed at an even higher speed (about 3 times as high as in the conventional method), and the welding speed can further be increased if an electrode with a wedge-shaped tip is used. When the electrode with a wedge-shaped tip is used inclinedly, the welding can be performed at the highest speed possible in accordance with the method of this invention.

EXAMPLE 4

This Example shows a comparison of the arc force of an electrode with a wedge-shaped tip with that of an electrode with a conical tip.

A water-cooled copper panel was faced with an electrode with a conical tip having an angle of 40° and an electrode with a wedge-shaped tip having an angle of 40° at right angles thereto. Arc was generated at the arc current shown in Table 4, and the pressure of arc at that position of the water-cooled copper plate which was immediately below the electrode was measured. The results are shown in Table 4 and FIG. 9.

Table 4

| Arc current (Amp) | Maximum arc force (mmAq) | |
|---|---|---|
| | Conical electrode | Wedge-shaped electrode |
| 150 | 74 | — |
| 200 | 111 | — |
| 250 | 143 | 34 |
| 300 | 183 | 52 |
| 350 | — | 71 |

It is clear from FIG. 9 that the use of an electrode with a wedge-shaped tip can reduce the arc force to about ⅓ as compared with a conventional electrode with a conical tip.

What I claim is:

1. In a method of gas shield arc welding a metal workpiece with a gas shield arc welding torch which includes a shield gas nozzle surrounding a metal electrode wherein welding is performed while a shield gas flows from the shield gas nozzle and surrounds the arc generated between the electrode and the metal workpiece, said arc locally melting and gouging the metal workpiece, whereby a molten pool of molten metal gathers in said gouging,
the improvement comprising,
providing a control gas nozzle in parallel with the axis of said electrode in the space between said electrode and the inner wall of said shield gas nozzle, said control gas nozzle being located in said space at a position which is rearward of said electrode with regard to the welding direction, said control gas nozzle having a tip whose gas flow outlet opens toward the molten pool during welding; and
performing gas shield arc welding while applying a control gas stream, through said control gas nozzle, at a pressure higher than the pressure of said shield gas, to the surface of said molten pool rearward of the position at which the molten pool attains its maximum width, thereby pressurizing and cooling the molten metal in said molten pool and deflecting the arc in the welding direction.
whereby the shape of the molten pool is controlled to prevent bead defects.

2. The method of claim 1 wherein said metal electrode is nonconsumable and has a wedge-shaped tip.

3. The method of claim 1 wherein the control gas stream is applied intermittently to the surface of said molten metal.

4. The method according to claim 3 wherein the period of changing the flow rate of said control gas stream is about 10 to 50 Hz.

5. The method of claim 1 wherein the inside diameter of said control gas nozzle is from about 1 to about 4 mm.

6. The method according to claim 5 wherein said control gas stream flows at a flow rate sufficient to provide a dynamic pressure on the rear part of said molten metal in the range of about 100 mm Aq to about 300 mm Aq.

7. The process according to claim 6 wherein said dynamic pressure is from about 40 mm Aq to about 100 mm Aq.

8. The method according to claim 1 wherein welding is performed at a welding current of DC 100 A to 500 A and at welding speeds of at least 10 cm/min.

9. The method according to claim 1 wherein welding is performed at a current of at least DC 200 A and at a welding speed of at least 60 cm/min.

* * * * *